(12) United States Patent
Vincent et al.

(10) Patent No.: US 6,934,457 B2
(45) Date of Patent: Aug. 23, 2005

(54) CASSETTE FOR COILING OPTICAL FIBERS

(75) Inventors: Alain Vincent, Juilly (FR); Richard Biaud, Acheres (FR)

(73) Assignee: Nexans, Paris (FR)

( * ) Notice: Subject to any disclaimer, the term of this patent is extended or adjusted under 35 U.S.C. 154(b) by 4 days.

(21) Appl. No.: 10/371,153

(22) Filed: Feb. 21, 2003

(65) Prior Publication Data

US 2004/0120679 A1 Jun. 24, 2004

(Under 37 CFR 1.47)

(30) Foreign Application Priority Data

Feb. 25, 2002 (FR) ............................................. 02 02728

(51) Int. Cl.⁷ ................................................. G02B 6/00
(52) U.S. Cl. ....................................... 385/135; 385/134
(58) Field of Search ................................... 385/134, 135

(56) References Cited

U.S. PATENT DOCUMENTS

| | | | |
|---|---|---|---|
| 5,131,066 A | * 7/1992 | Foss ........................... | 385/135 |
| 5,420,956 A | * 5/1995 | Grugel et al. ................ | 385/135 |
| 5,572,617 A | * 11/1996 | Bernhardt et al. ........... | 385/135 |
| 5,689,606 A | 11/1997 | Hassan ........................ | 385/135 |
| 5,740,299 A | 4/1998 | Llewellyn et al. ........... | 385/135 |
| 6,215,938 B1 | 4/2001 | Reitmeier et al. ........... | 385/135 |
| 6,282,360 B1 | 8/2001 | Milanowski et al. ........ | 385/135 |

FOREIGN PATENT DOCUMENTS

| | | |
|---|---|---|
| FR | 2748576 | 11/1997 |
| WO | 9427176 | 11/1994 |

OTHER PUBLICATIONS

Preliminary Search report dated Oct. 22, 2002.

* cited by examiner

Primary Examiner—John D. Lee
Assistant Examiner—Jennifer Doan
(74) Attorney, Agent, or Firm—Sofer & Haroun, LLP

(57) ABSTRACT

The present invention provides a cassette for coiling at least one optical fiber provided with a splice protection, in which said optical fiber is to be wound in such a manner as to fit closely against an inside peripheral wall of said cassette, said cassette being provided with two entry points in the vicinity of said inside peripheral wall to enable two portions of said optical fiber situated on either side of said splice protection to penetrate into said cassette. According to the invention, said entry points are provided with guide means so that said two portions wind in the same direction, and said splice protection takes up a non-predetermined position in said cassette. The present invention is more particularly adapted to coiling a flat optical fiber ribbon having a splice.

11 Claims, 4 Drawing Sheets

FIG_1

FIG_2

CASSETTE FOR COILING OPTICAL FIBERS

The present invention relates to a cassette for coiling at least one optical fiber provided with a splice and protection for the splice, the cassette being more particularly adapted to coiling a flat ribbon of optical fibers provided with a splice.

BACKGROUND OF THE INVENTION

A ribbon of optical fibers comprises a set of optical fibers placed parallel to one another and embedded in a common outer coating, referred to as the "matrix", e.g. made of a resin, the coating presenting a flat outer profile. The number of fibers grouped together in a ribbon may lie in the range 4 to 24, each fiber comprising in conventional manner a silica core of diameter less than 10 micrometers ($\mu$m), silicon cladding around the core with a diameter of about 125 $\mu$m, and a protective sheath of resin having a diameter equal to about 250 $\mu$m. FIG. 1 is thus a diagrammatic section of a ribbon 2 comprising a plurality of optical fibers 19, the ribbon 2 itself being coated in a matrix 20.

In optical fiber telecommunications networks where such ribbons are used, it is very often useful to be able to connect all or some of the fibers of a ribbon from which the coating has been removed to all or some of the fibers of another ribbon from which the coating has likewise been removed. Such a connection is made by means of a splice. The splice is made after stripping the sheaths from the individual fibers and putting the fibers that are to be connected together into end-to-end contact, the connection being held together by mechanical means, by welding methods, or by adhesive. After connection, the splice is covered in protection that gives rise to considerable extra thickness compared with the ribbon.

In order to make connection easier, it is important to have an extra length of ribbon available so as to be able to bring the end of the ribbon to a connection tool. This extra length makes it easier to handle the ends of the two ribbons without subjecting the ribbons to excessive stress, and in particular without either of the ribbons being subjected to bending exceeding a predetermined limit beyond which bending can lead to light being lost by attenuation, to damage, or even to the ribbon breaking. Once the connection has been made, the extra length of ribbon including the splice with its protection is placed inside a stowage cassette. Several types of stowage cassette have already been disclosed.

Thus, document FR 2 748 576 describes a cassette for coiling optical fiber ribbons carrying splice protection by using a cylindrical hub that is rotatable about the center of the cassette. The fact that the hub turns makes it easier to wind the ribbon around the hub; each of the ribbons connected together by a splice enters via a respective different entry to the cassette and the splice protection is fixed in a cavity formed in the thickness of the hub. That technique enables the ribbon to be held against the hub and prevents the ribbon from escaping from the cassette.

Nevertheless, implementation raises certain difficulties. In addition to the fact that the mechanical device is itself quite complicated, it is also necessary, for proper operation, to ensure that both ribbons connected together by a splice present the same length from their respective entry points into the device. Otherwise, there will always be a length of ribbon that is not properly stowed and that will give rise to installation stresses which must be overcome by a person acting on the telecommunications network.

Document WO 94/27176 describes a cassette for coiling optical fiber ribbons carrying a splice with protection. That cassette uses means for guiding the ribbon inside the cassette; the ribbons connected together by a splice enter the cassette via respective different entries and in opposite directions, and the splice protection is secured by a holding device. The ribbon is thus stowed by following guide means and by fixing the splice protection.

However, the use of such guide means distributed over the surface of the cassette requires the cassette to have a large stowage area in order to ensure that the ribbon has a radius of curvature that is large enough, particularly when the ribbon is long. The act of winding the ribbon into the cassette from the outside through the guide means causes the radius of curvature to decrease quickly as the ribbon comes closer to the center of the cassette.

In addition, securing the splice protection gives rise to significant installation stresses that are often associated with a spring effect of the ribbon, which can no longer take up its natural position. Such stresses can lead to undesirable twisting, and to radii of curvature of the ribbon that are not under control and that lead to light being lost by attenuation.

OBJECTS AND SUMMARY OF THE INVENTION

The present invention seeks to provide a cassette for coiling at least one optical fiber carrying a splice with protection, the cassette enabling a long length of fiber to be stowed without increasing the surface area of the cassette, enabling problems associated with installation stresses to be overcome, and enabling different lengths of fiber to be used from their respective entry points.

For this purpose, the present invention provides a cassette for coiling at least one optical fiber provided with a splice and protection for the splice, in which said optical fiber is to be wound in such a manner as to fit closely against an inside peripheral wall of said cassette, said cassette being provided with two entry points in the vicinity of said inside peripheral wall to enable two portions of said optical fiber situated on either side of said splice protection to penetrate into said cassette, wherein said entry points are provided with guide means so that said two portions wind in the same direction, and said splice protection takes up a non-predetermined position inside said cassette.

By means of the invention, after the splice has been made, the two portions of ribbon are coiled in the same direction and simultaneously from their respective entry points into the cassette, and the fiber uses its own natural return force acting towards the inside peripheral wall of the cassette so as to come and press against it. As a result, the radius of curvature of the fiber is essentially determined by the wall surface and varies little during winding. This makes it possible to stow a long length of fiber without any need to increase the area of the cassette.

In addition, the fiber takes up its natural position inside the cassette and this position is not constrained by the splice protection being secured; installation stresses are thus very low.

In addition, there is nothing to impede stowage of a fiber having two portions situated on either side of the splice protection that are of different lengths from their respective entry points.

Advantageously, said two entry points coincide. The cassette is then mechanically simpler and easier to stack if it is placed in an organizer for superposable cassettes.

In an embodiment, the cassette is for mounting in an organizer for superposable cassettes, in which case the cassette includes a flexible arm for pivoting relative to said organizer between a closed position and an open position, said arm enabling said fiber to be conveyed between the organizer and said entry point of said cassette, the length of the guide path for said fiber between said closed and open positions remaining constant. This cassette makes it possible to avoid any need to cope with an extra length on each opening/closing operation in the organizer. This type of organizer enables the number of cassettes to be adapted to match customer requirements and fiber capacities.

In an embodiment, the cassette for containing a fiber presents a reversal of direction giving it an S-shape, and has means for locking said fiber so as to maintain the S-shape. Since the portions situated on either side of the splice wind in the same direction, a reversal in the direction of the fiber will naturally be formed inside the cassette. It is then desirable to lock the portion of the fiber where the reversal of direction occurs so as to maintain a suitable radius of curvature for the fiber.

Advantageously, the locking means are at the center of the cassette.

Advantageously, the cassette has fiber-holding means, said holding means being disposed close to said inside peripheral wall of the fiber so as to limit movement in translation of said fiber parallel to the inside peripheral wall. These means thus enable the fiber to be held inside the cassette when the cassette is subjected to vibration in its operating environment.

In an embodiment, the inside peripheral wall is substantially circular in shape. This enables the fiber to fit closely to the outlines of the wall.

Advantageously, said two fiber portions are of lengths from their respective entry points into the cassette that are sufficiently different to ensure that the splice protection is not at the center of the cassette. When the peripheral wall is substantially circular in shape, the two fiber portions then have differences in length starting from their entry points that are not less than π×D/2, where D designates the diameter of said peripheral wall.

BRIEF DESCRIPTION OF THE DRAWINGS

Other characteristics and advantages of the present invention appear from the following description of an embodiment given by way of non-limiting illustration.

In the accompanying figures.

MORE DETAILED DESCRIPTION

Figure 1:
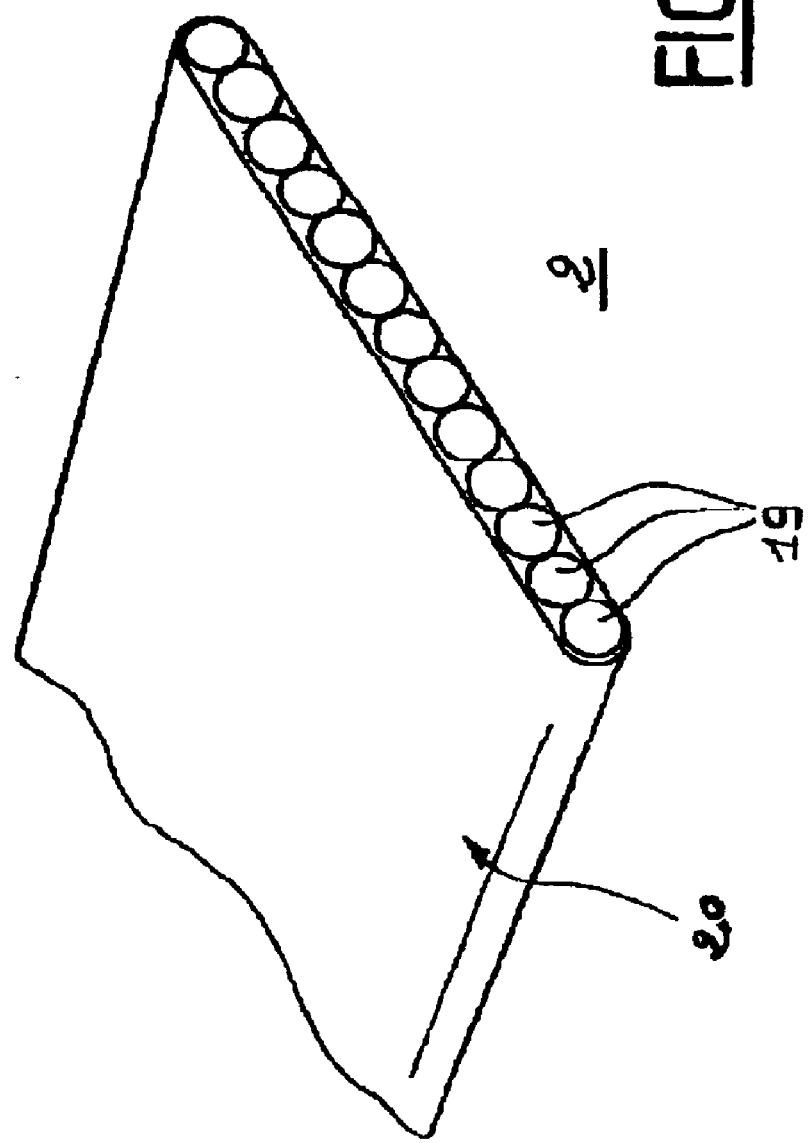
FIG. 1 is a section view of an optical fiber ribbon.

In all of the figures, elements that are common carry the same reference numerals.

FIG. 1 is described above with reference to the state of the art.

Figure 2:
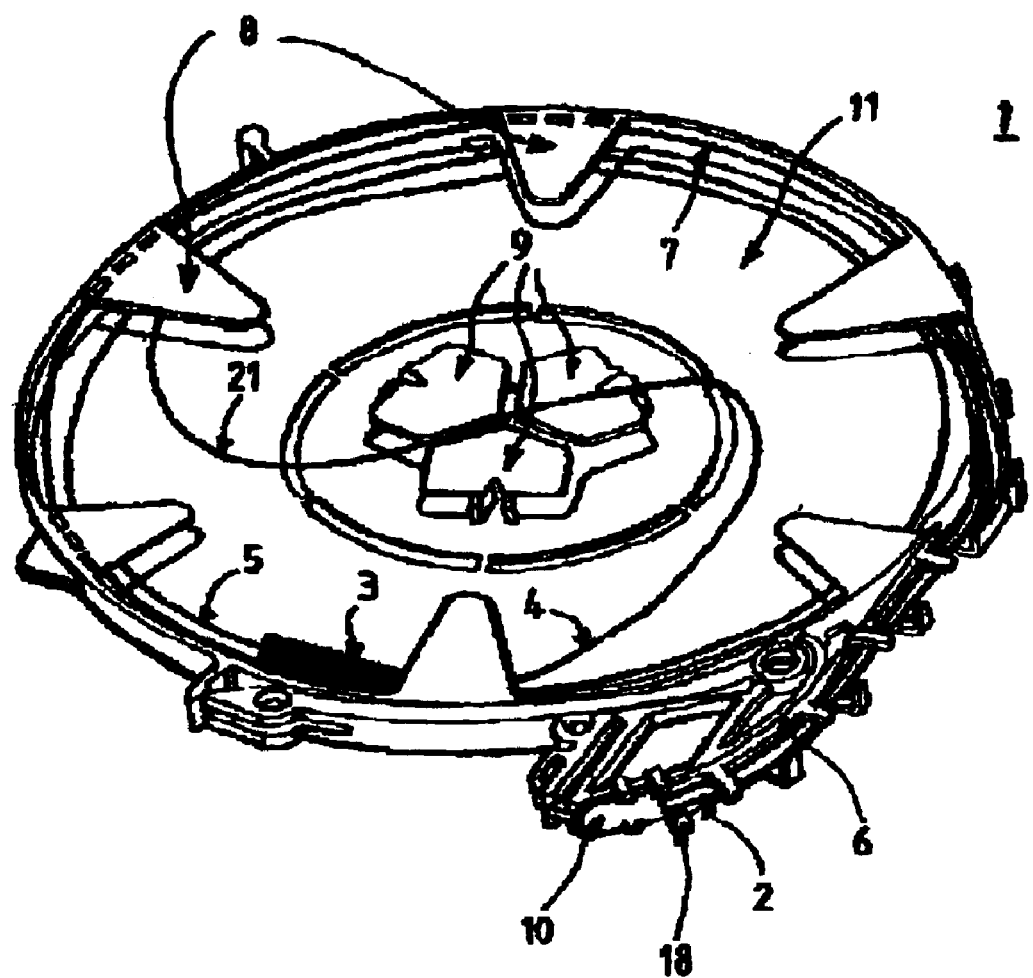
FIG. 2 shows a cassette in accordance with the invention for coiling an optical fiber ribbon, the cassette being shown containing a ribbon coiled inside it and with a flexible arm in the closed position.

FIG. 2 shows a circular cassette 1 of the invention having coiled therein an optical fiber ribbon 2 of the kind shown in FIG. 1 and provided with a splice protection 3. The splice protection 3 subdivides the ribbon 2 into two portions 4 and 5 situated on either side of the protection 3.

The cassette 1 has a flexible entry arm 6 with a ribbon entry point 10, an inside peripheral wall 7 in the form of a circle of diameter D having holding tongues 8 secured thereto, and a bottom surface 11. The flexible entry arm 6 is provided with guide tabs 18. The cassette also has locking means 9 situated in its center.

After making the splice and its protection 3, the person acting on the telecommunications network coils the two portions 4 and 5 simultaneously going away from the entry point 10, winding the two portions 4 and 5 in a counterclockwise direction and going from the outside towards the inside of the disk. The portions 5 and 4 are installed on the arm 6 by means of the guide tabs 18. The return force of the ribbon 2 is then sufficient to press the portions 5 and 4 against the inside peripheral wall 7. The holding tongues 8 ensure that the ribbon 2 is properly placed inside the cassette 1, in particular in the event of the cassette vibrating under certain operating conditions. It is important to set the diameter D in such a manner as to have a sufficient safety margin to ensure that the radius of curvature of the ribbon 2 never exceeds its authorized limit associated with maximum allowable attenuation for the optical fibers it contains.

By continuing to wind the ribbon, the splice protection 3 is brought into a non-predetermined position against the bottom surface 11 somewhere along the wall 7. The portion 4 of the ribbon 2 then changes direction in an S-shape 21, and the S-shaped portion 21 is locked in this position by the locking elements 9. The locking elements 9 are disposed so as to lock the S-shaped portion regardless of the position of the splice protection 3 on the bottom surface 11.

If it is desirable to ensure that the splice protection 3 remains along the wall 7 and does not reach the center of the surface 11, then it is necessary to ensure that the two portions 4 and 5 are of different lengths from the entry point 10. It may be desirable to avoid subjecting the splice protection to excessive stresses which could arise at the center of the cassette. To a first approximation, this difference in length must be not less than π×D/2. The quantity π×D/2 represents approximately the length of the S-shaped portion of the ribbon 2.

Figure 3:
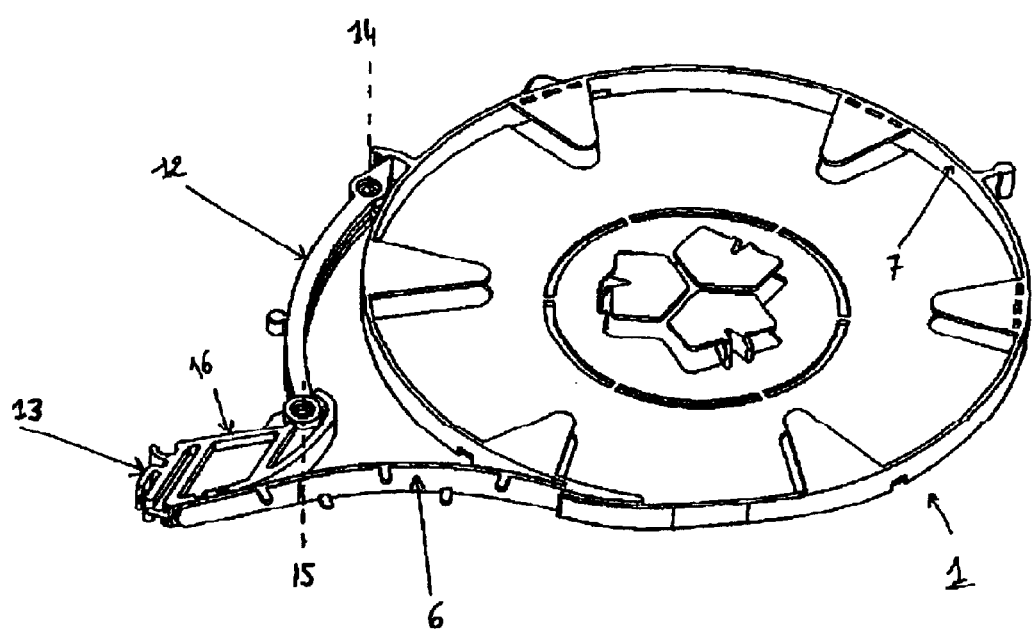
FIG. 3 shows the FIG. 2 cassette with its flexible arm in the open position.

FIG. 3 shows the cassette 1 without the ribbon 2 and with its flexible arm 6 in the open position. One end of the arm 6 is connected to the peripheral wall 7, and its other end is connected to a part 16 possessing snap-fastening means 13. The cassette 1 also has a rigid arm 12 connected both to the wall 7 and to the arm 6 via the part 16. The arm 12 can pivot about a pivot axis 14 situated in the vicinity of the wall, and can also pivot about a pivot axis 15 belonging to the part 16.

Figure 4:
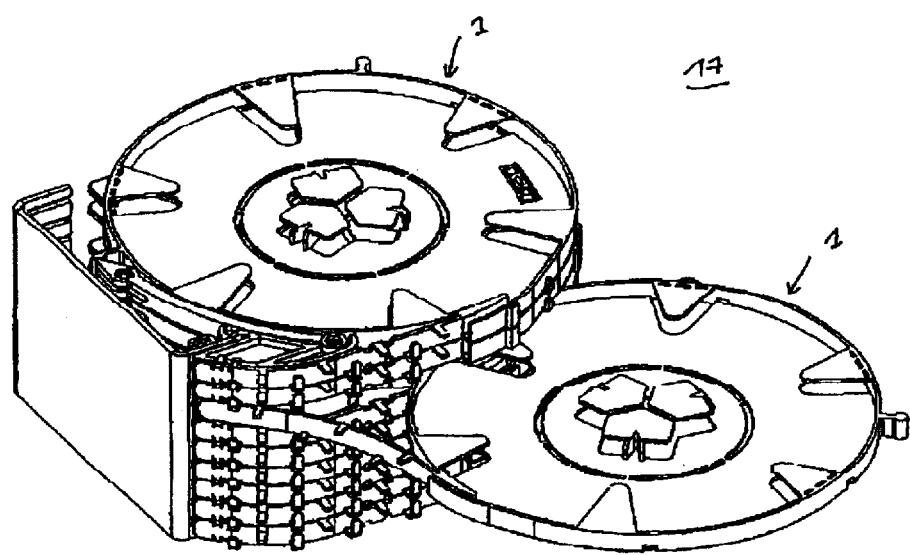
FIG. 4 shows an organizer for superposing cassettes of the invention.

FIG. 4 shows an organizer 17 for superposing cassettes 1 of the invention. The cassettes 1 can be superposed and they are fixed to the organizer 17 via the snap-fastening means 13 shown in FIG. 3.

The cassette 1 is changed from its closed position shown in FIG. 2 to its open position shown in FIG. 3 by moving the cassette 1 in translation and in rotation. The rotation is induced by the movement of the flexible arm 6 against which the cassette 1 winds in part, and the translation is induced by the movement of the rigid arm 12 which is extended by turning about the axes 14 and 15. Because of this movement, there is never any extra length of ribbon between the open and closed positions of the cassette 1. In addition, the ribbons are never stressed during handling and other action taken on telecommunications networks.

Naturally, the invention is not limited to the embodiment described above.

In particular, the embodiment relates to a cassette having a single entry point, but it is possible to devise a cassette having two entry points, providing both portions of the ribbon are wound in the same direction.

Furthermore, the embodiment discloses a cassette for an optical fiber ribbon, however the invention can also be used for stowing single optical fibers provided with splice protections.

In addition, the cassette is described above as being circular in shape, but any other shape could be envisaged.

In addition, it is possible to stow a plurality of splice protections by superposing the ribbons.

Finally, any means may be replaced by equivalent means without going beyond the ambit of the invention.

What is claimed is:

1. A cassette for coiling at least one optical fiber provided with a splice and protection for the splice, in which said optical fiber is to be wound in such a manner as to fit closely against an inside peripheral wall of said cassette, said cassette being provided with two entry points in the vicinity of said inside peripheral wall to enable two portions of said optical fiber situated on either side of said splice protection to penetrate into said cassette, wherein said entry points are provided with guide means so that said two portions wind in the same direction, and said splice protection takes up a non-predetermined position inside said cassette.

2. A cassette according to claim 1, wherein said two entry points coincide.

3. A cassette according to claim 2, for mounting in an organizer for superposable cassettes, said cassette having a flexible arm for pivoting relative to said organizer between a closed position and an open position, said arm enabling said fiber to be conveyed between the organizer and said entry point of said cassette, the length of the guide path for said fiber between said closed and open positions remaining constant.

4. A cassette according to claim 1 for containing a fiber presenting a reversal of direction giving the fiber an S-shape, the cassette being wherein said cassette includes locking means for locking said fiber in such a manner as to maintain its S-shape.

5. A cassette according to claim 4, wherein said locking means are at the center of said cassette.

6. A cassette according to claim 1, including holding means for holding said fiber, said holding means being disposed close to said inside peripheral wall so as to limit movement in translation of said fiber parallel to said inside peripheral wall.

7. A cassette according to claim 1, wherein said inside peripheral wall is substantially circular in shape.

8. A cassette according to claim 7, for use with a fiber such that said two fiber portions have lengths starting from their entry points that differ by not less than, $\Pi \times D/2$, where D designates the diameter of said peripheral wall.

9. A cassette according to claim 1 for use with a fiber such that said two fiber portions are of lengths starting from their entry points into said cassette that are sufficiently different to ensure that the splice protection is not at the center of said cassette.

10. A cassette for coiling at least one optical fiber provided with a splice and protection for the splice, in which said optical fiber is to be wound in such a manner as to fit closely against an inside peripheral wall of said cassette, said cassette being provided with two coinciding entry points in the vicinity of said inside peripheral wall to enable two portions of said optical fiber situated on either side of said splice protection to penetrate into said cassette, wherein said coinciding entry points are provided with guide means so that said two portions wind in the same direction, and said splice protection takes up a non-predetermined position inside said cassette;

wherein said cassette is mounted in an organizer for superposable cassettes, said cassette having a flexible arm for pivoting relative to said organizer between a closed position and an open position, said arm enabling said fiber to be conveyed between the organizer and said entry point of said cassette, the length of the guide path for said fiber between said closed and open positions remaining constant.

11. A cassette for coiling at least one optical fiber provided with a splice and protection for the splice, in which said optical fiber is to be wound in such a manner as to fit closely against an inside peripheral wall of said cassette, said inside peripheral wall being substantially circular in shape, said cassette being provided with two entry points in the vicinity of said inside peripheral wall to enable two portions of said optical fiber situated on either side of said splice protection to penetrate into said cassette, wherein said entry points are provided with guide means so that said two portions wind in the same direction, and said splice protection takes up a non-predetermined position inside said cassette;

wherein said optical fiber used with said cassette is such that said two fiber portions have lengths starting from their entry points that differ by not less than, $\Pi \times D/2$, where D designates the diameter of said peripheral wall.

* * * * *